United States Patent [19]

Hahn et al.

[11] Patent Number: 4,725,389
[45] Date of Patent: Feb. 16, 1988

[54] METHOD FOR FOAMING AND SINTERING OF FOAMING PLASTIC

[75] Inventors: Ortwin Hahn, Hufferweg 9, D-4790 Paderborn; Mohamed-Hussein Tiba, Paderborn, both of Fed. Rep. of Germany

[73] Assignee: Ortwin Hahn, Paderborn, Fed. Rep. of Germany

[21] Appl. No.: 820,841

[22] Filed: Jan. 21, 1986

[30] Foreign Application Priority Data

Jan. 23, 1985 [DE] Fed. Rep. of Germany ....... 3502006

[51] Int. Cl.$^4$ ................... B29C 67/04; B29C 67/22; C08J 9/22
[52] U.S. Cl. ...................... 264/40.5; 264/40.6; 264/45.4; 264/53; 264/328.1; 264/DIG. 9; 264/DIG. 83; 425/144; 425/149
[58] Field of Search .............. 264/40.6, 45.4, 53, 264/DIG. 9, DIG. 10, DIGS. 15-17, DIG. 83, 328.1; 425/144, 149

[56] References Cited

U.S. PATENT DOCUMENTS

| | | | |
|---|---|---|---|
| 3,328,497 | 6/1967 | Baxter et al. | 264/53 |
| 3,963,816 | 6/1976 | Smith | 264/53 |
| 4,244,897 | 1/1981 | Moon | 264/40.6 X |
| 4,333,897 | 6/1982 | Hayashi et al. | 264/40.6 |
| 4,615,849 | 10/1986 | Hahn | 264/40.6 X |

FOREIGN PATENT DOCUMENTS

| | | | |
|---|---|---|---|
| 72499 | 2/1983 | European Pat. Off. | 264/45.4 |
| 3243632 | 5/1984 | Fed. Rep. of Germany . | |
| 2121409 | 8/1972 | France | 264/53 |
| 57-6731 | 1/1982 | Japan | 264/40.6 |

Primary Examiner—Jeffery Thurlow
Assistant Examiner—Leo B. Tentoni
Attorney, Agent, or Firm—Sprung Horn Kramer & Woods

[57] ABSTRACT

A method for foaming and sintering of foamable plastic employing a control method based on the detection of the softening time point during the sintering steam application in the sintering process step. The softening time point is detected by analysis of a change in the rising speed of the pressure or temperature, and the related pressure and temperature values are used for determining the maximum dismission temperature and pressure of the sintered product. The sintering time is determined in relation to the softening time point and the quality demanded. A feed back control to the prefoaming and drying process step is provided. A feed back control by means of a quality measurement at the sintered part to the sintering is provided. Incremental controls are provided for adaptive process optimization.

12 Claims, 7 Drawing Figures

METHOD FOR FOAMING AND SINTERING OF FOAMING PLASTIC

The invention relates to a method by which foaming plastic is foamed in a prefoaming device by controlled heat application to reduce the density and enlarge the bead size of the plastic material and then it is dried at a predetermined temperature and air moisture content during a predetermined drying time and then it is cycle by cycle injected into a sintering chamber in which thereafter in a heating phase heat and process steam is applied to it until depending from a given sintering pressure in the sintering chamber the heat and steam application is terminated and a following cooling phase is started and afterwards dismissing the sintered product after the sintering chamber was reaching or passing a given maximum dismission pressure and a given maximum dismission temperature.

From DE-OS No. 3243 632 a method of controlling the process parameters of a prefoaming and sintering process depending from sinter pressure signals, whereby the pressure signals are used in connection with certain material data, as are density, bead size, propellant content and humidity content for the determination of the sintering pressure or maximum dismission reaching which the respective phases are finished or the dismissing is performed.

The evaluation of such material data correlations are expensive and time consuming. Further the humidity, air content and propellant content are changing during the delay time between foaming and sintering. Further the dependencies of the different material data for the definition of the sintering and dismission pressure which are used for the control of the duration of the sintering phases are empirical functions the finding of which is tedious and is to be reworked for different geometries of sinter chambers to be used.

The object of the present invention is a method which produces sintered products of a predetermined quality from foaming plastic by a temperature or pressure dependent control of the sintering process and its phase durations without preliminary investigation of the material data or equivalent historical data of the prefoamed material.

The object is attained by detecting a softening time point from the timely course of the pressure or temperature in the sintering chamber in relation to which softening time point the end of the heating phase and process steam application and the beginning of the cooling phase is determined and further with relation to a sintering temperature which is measured at the softening time point or from a sintering pressure at that point in time the time of dismission or the maximum dismission pressure and temperature are determined reaching or passing which the dismission takes place.

According to a preffered version of the method the softening time point is detected from the change of the rising speed of the sintering pressure or temperature. The rising speed of the sintering pressure drastically is slowing down at the beginning of the softening of the plastic material. The temperature rise of the wall of the sintering chamber has a stand still for less than a second or is negative for e.g. 1° C. when the sintering cake is going to cover the wall of the sintering chamber fully, thereby improving the heat exchange to it. Thereafter the temperature rises quicker than before. Further in the condensed vapour leaving the sintering chamber at an outlet the rise of the temperature is showing a sharp increase from the softening time point on which can be used for its detection advantageously.

In a simplified version only a temperature sensor is applied to the sintering chamber or condensate outlet and from its sensor signal the softening time point and relative to this the end of the process steam application, the end of the heating phase and the time of dismissing it determined. Even by this simplified method an improvement of the process economy will be achieved, especially if a moderate quality is demanded. Tolerances coming from the precedent process steps of prefoaming, drying and interim deposition are compensated in their effects on the quality of the final product nearly without time penalty because the sintering time in the softened state of the plastic material is always well defined.

Other advantageous versions of the method are given in the claims.

The improved control procedure of the sintering process advantageously can by feedback be extended to the prefoaming and drying process steps thus covering the total production process. This total production process control is based on the fact that all the process steps are mainly determined by the humidity, air and propellant content of the plastic material and by realizing that during the beginning of the sintering by analyzing of the course of the sintering pressure the humidity, air and propellant content can be determined in an absolute or relative manner. These material data advantageously are the basis for the feed back control of the precedent process steps, which leads to delivering prefoamed and preconditioned material from process step to process step and to sintering of nearly constant quality. Further these evaluated material data are used for the determination of the control of the sintering as shown before. Third from the evaluated propellant content by means of the known relation between it and the so-called glass temperature of the plastic material the maximum dismission temperature is determined, which is to be obeyed besides of the maximum dismission pressure. The sintering time during which heat is further applied to the softened sintering cake and the maximum dismission temperature and pressure further depend on the quality and precision of the sintered product demanded.

If the cooling characteristic of a sintered chamber is known instead of a maximum dismissing temperature the cooling and dismissing time can be determined from the sintering pressure at the softening time point or from the rising speed of the sintering pressure at the beginning of the sintering phase.

The analysis of the courses of the pressure and temperature for determination of the material data respectively the process control data are based upon the following relations:

The unfoamed raw material usually contains liquid propellant of e.g. 8% of its weight. During the prefoaming process step the propellant is evaporated by heat application. After reaching the softening temperature of the plastic material at, e.g. 90° C., it is swelling the beads and leaves it as far as a surplus of propellant is present. Thereby during prefoaming the propellant content finally reaches 4–6%.

During the interim storing process step drying air having a temperature lower than the softening temperature, that is under 60° C., is applied to the beads for extraction of the humidity which is resulting from the heating steam condensation during the prefoaming step.

Further depending on temperature and storage time another portion of the propellant is diffusing out of the beads while it is replaced by inwards diffusing air. These such given ingredients as are humidity, propellant and air content of the prefoamed and interim stored material are causing different effects during the sintering process step.

The humidity causes an additional heat demand during the heating of the sintering material. From the relation of the specific heat content of the plastic material and the water contained can be calculated that at a humidity content of 20% the amount of heat needed for heating the sintering material is doubled, which means that twice the process steam is needed compared to the dry material demand. If no drying process step is performed after prefoaming then about 20% condensed humidity is present as can be calculated from the heat content of the plastic material and the condensation heat.

If in a given sintering chamber the pressure rising speed is known for heating of dry plastic material by process steam then a slower rising speed at a later process cycle with unknown materials indicates the presence of humidity in it. Because of this the rising speed of the pressure depends on other material data such as the raw material density and the propellant content as will be shown further down.

Such material which is less prefoamed than is prescribed for a certain product, thus having a higher raw material density, will need a higher amount of heat. On the other hand the lower propellant loss during the shortened prefoaming step leads to a quicker rise of the sintering pressure. Both those effects which lead to a slower pressure rise, i.e. the higher humidity content and the higher raw material density, can be differentiated because in case the higher density material is used the sintering pressure is rising to a higher value until at the softening point the pressure rising speed is decreasing to a moderate value. Evaluating this, a differentiation of a deviation of the pressure rise from a standard value is done and a respective equalizing control of the precedent process steps is performed.

Basically an increased propellant content results in a decrease of the softening temperature of the plastic material. When heating or steaming the sintering material, a pressure rise takes place in the beads, which is distributed elastically from the bead walls to the wall of the sintering chamber. Such pressure is to be measured there giving the sintering pressure course. As soon as during heating the softening temperature is reached, the beads are spreading into their intermediate volume, thus the pressure rise is decreasing. From the height of the temperature at this event or indirectly from the pressure value at this event, as far as the raw material density can be considered constant, the propellant content is determined, whereby the lower the respective temperature the higher the propellant content. The sintering pressure related to the softening point is at its maximum at a moderate propellant content as will be shown further down. Inversely related to the propellant content is the air content of the beads because, as far as the intermediate storage time was sufficient, missing propellant gas is replaced by air. In case the beads are during storage below the boiling temperature of the propellant, which is 36° C. at a pressure of 1 bar for n-pentane, the beads are nearly completely filled with air and the propellant is nearly completely condensated. During the heating in the sintering process the propellant evaporates according to its saturation pressure until latest at 60° C. and at an inner pressure of 2 bar the liquid propellant will be completely gasified and an air-pentane mixture is filling the beads the pressure of which at constant volume, as long as no softening of the plastic material occurs, is rising from then on only in proportion to the absolute temperature of it.

If an intermediate storing is performed at a temperature of 60° C., then during a certain time by diffusion the n-pentane inner pressure drops to 1 bar and nearly no air will diffuse into the beads. Thereafter at much slower speed an exchange of air against propellant takes place.

Because depending from the conditions passed the inner pressure and propellant content may vary widely, and this effects the rise of the sintering pressure during the sintering step. The analysis of the course of the pressure for generating control signals for the prefoaming and interim storage steps is only possible if not all of the influencing parameters as temperature, time, air volume and speed etc. are variable and undefined. If some of them are fixed, then at least three of them can be controlled independently by means of the following three control parameters:

1. A first control parameter is the deviation of the pressure rising speed at the beginning of the sintering phase compared to a given rising speed,
2. a second control parameter is the deviation of the sintering pressure at the softening time point from a given pressure value and
3. a third control parameter is the deviation of the sintering temperature at the softening time point from a given temperature value.

It has proven useful to apply the first control parameter for the correction of the drying process step effecting an intensification or prolongation of the drying time as much as the pressure rise lags behind the given value and further to apply the second control parameter for the correction of the prefoaming process step to effect an intensification or prolongation of the foaming time to reduce the raw material density of the prefoamed material in as much as the sintering pressure is larger than the given value and to apply the third control parameter to effect the temperature during the intermediate storage time or the storage time itself enlarging the one or the other in as much as the sintering temperature is smaller than the given value. By this feed back control the prefoamed material will be standardized in its three main material data prior to injection into the sintering chamber, except by the material data, which are controlled as shown, the pentane or propellant content effects the sintering process having an influence on the softening temperature, pressure and time. This softening time point can be detected quite precisely by watching the rising speed and continously checking at which point in time it is reduced below a certain percentage, e.g. 25%, of the rising speed measured at the beginning of the sintering phase. According to a second detection method the temperature rising speed is watched in a likewise manner. By using this detection method for evaluation of the softening point in time neither construction details nor the geometry of the sintering chamber effects it. The sintering of the material in particular starts with the softening of the material, thus after a socalled holding time during which further process steam is applied and heating is continued, lasting or about 4, 6 or 8 sec. depending on the quality demanded, the sintering is completed. Continuation of heating will lead to overheating, decomposition, shrinking or bending of the sintered product. This enables one to control the duration of the sintering in a simple but effective way because the determination of the sintering duration starts exactly from the softening point and not as in conventional equipment from a point in time when the sintering pressure has reached a given value which is influenced by many material data and the sintering chamber geometry data.

High and constant quality of the final product results from this and sintering time and energy savings are achieved. A further energy and time saving results during the cooling phase because the sintering chamber walls are heated only to the extend needed to reach the quality demanded.

From the sintering pressure or preferably the sintering temperature at the softening point in time the maximum dismission pressure and temperature below which a dismission without deformation of the sintered product is possible can be determined very precisely because it depends from the propellant or pentane content with relation to the glass temperature as known and this content will be determined from the course of the sintering pressure or the sintering temperature at the softening time point as described before. At relatively high pentane content the softening temperature as well as the related sintering pressure are relatively low and in consistency with this the maximum dismission temperature will be relatively low. Further at a higher pentane content the inner pressure in the beads is higher which leads to an increased risk of swelling after dismission wherefore the maximum dismission pressure will be lower the higher the pentane content is respectively the lower the temperature or pressure at the softening time point is.

At a moderate pentane or propellant content the softening temperature has a moderate value but the pressure wil be higher than at other pentane concentrations. This leads to a determination of a moderate maximum dismission temperature and pressure. At a small propellant or pentane content and correlated high air content of the beads the softening temperature is relatively high and the related sintering pressure is respectively lower. This leads to a determination of a relatively high maximum dismission temperature and a moderate maximum dismission pressure.

To keep the process time which consists of the heating phase time and the time until the dismission as short as possible and to keep (for economic reasons) the difference between the sintering and dismission temperatures and pressures as low as possible, the propellant content of the preconditioned material before sintering preferably will be kept at a defined low level to get a short sintering time at a moderate steam pressure and to get a quick pressure release during the following cooling phase down to the related dismission state.

Advantageously the pentane content is kept low and consequently the maximum dismission temperature is chosen as high as possible which lead at first to savings of process time and energy and second to relatively dry sintered parts and third especially shrinking or collapsing of them is avoided. Otherwise at higher pentane content and corresponding low air content the beads tend to collapse when the water vapour, which is diffusing into them, will condensate when the temperature is dropping below 100° C. and if most of the pentane was diffusing out of them during sintering. In this case a quick cooling will cause an underpressure in the inner of the beads.

The difference between the softening temperature and the maximum dismission temperature will be chosen with respect to the tolerances allowed for shrinking and swelling whereby given narrow tolerances of part dimensions and thicker parts need a higher temperature difference.

Advantageously the minimum holding time of the sintering will be determined for the consecutive cycles from the deviations between measured pressure tension values compared to given standard values. These pressure tension values are measured at the dismissed ready products.

Further advantageously an impact reaction measurement is performed at the sintered part which will deliver a measure for the shock absorption especially for packing material.

The determination of the length of the holding time can be conducted corresponding to a given pressure strength or shock absorption factor quality standard.

The determination of the maximum dismission temperature and pressure can be conducted such that such temperature and pressure are lower the lower the sintering temperature or pressure at the softening time point are and the temperature difference between the sintering temperature and the maximum dismission temperature is larger the closer a given size deformation quality standard is.

Both measurements of the pressure tension and the impact reaction are to be performed at a given part temperature or they are to be correlated to it according to an experimentally determined and stored function. The deviation of the impact reaction value to a standard value are used for the determination of the temperature and pressure difference between the sintering temperature and pressure at the softening time point and the maximum dismission temperature and pressure thereby reducing the deviation in future cycles. Further the deviation of the impact reaction especially for the production of packing material will be used to control the sintering steam pressure which defines the steam temperatures as well. A higher steam pressure activates the sintering at the surface of the sintering cake and its inner portion will be looser and provide higher absorption. Increasing the steam pressure will on the other hand enlarge the time and energy consumption in each cycle wherefore it is determined only as high as necessary to reach the impact reaction demanded.

Further a humidity content measurement is performed on the sintered parts. The detected deviation of the humidity value related to a given value may be used to control the sintering steam pressure as well.

The deviations of the values which are used for the control purposes during the following cycles as shown preferably are used to change the reference values of the controls in increments thereby achieving a step-by-step optimization. The summed increments representing the optimum reference value at a time are stored. Further the actual reference values may be listed and correlated to the parts produced and to their performance to serve for later start-up of a like product.

Figure 1:
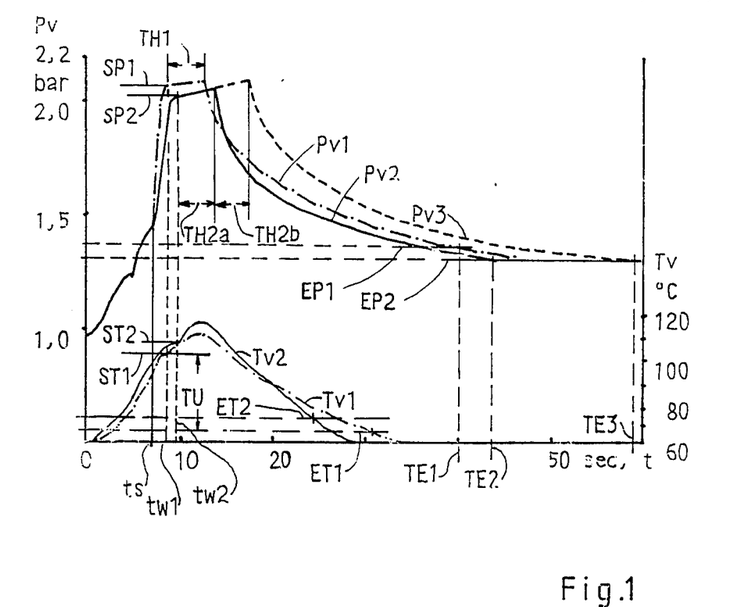
FIG. 1 is showing pressure and temperature courses of sintering cylces of parts made from materials of different raw material density and produced with different holding times.
Figure 2:
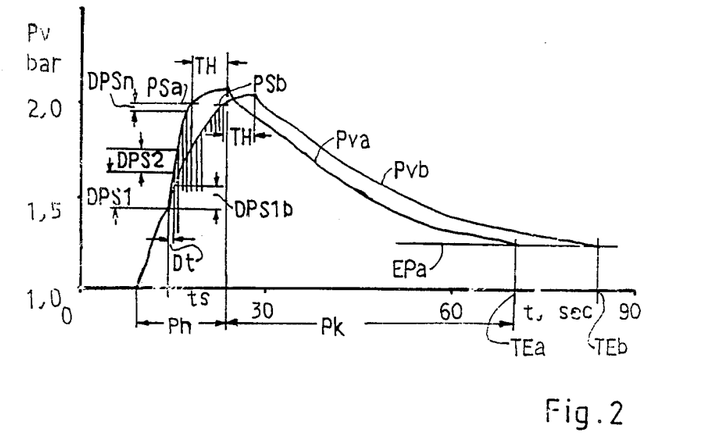
FIG. 2 is showing pressure and temperature courses during sintering of material having different humidity contents.
Figure 3:
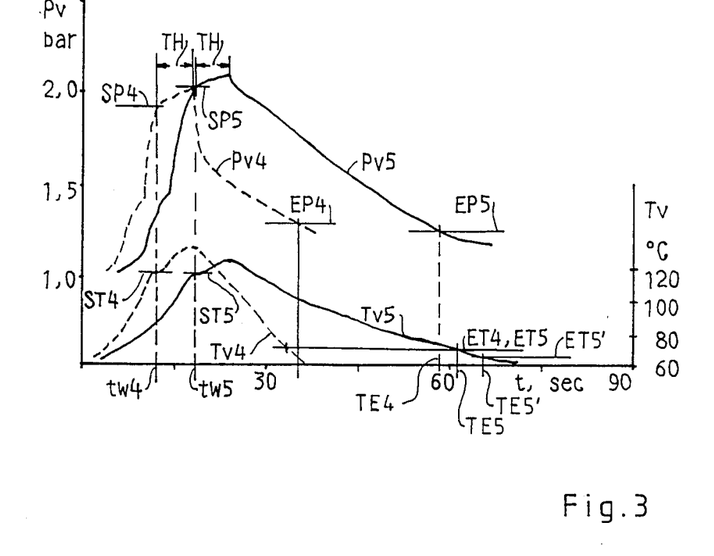
FIG. 3 is showing pressure and temperature courses of parts of different thicknesses.

The signal courses in FIGS. 1 to 3 are selected to visualize that the process control due to the similarity of the characterizing features of the courses is performed independently of further influences or informations of material data as are the raw material density or the humidity content or the product geometry as the thickness of a part. In FIG. 1 a pressure course Pv1 and the related temperature course Tv1 in a dash-point manner is shown. From the starting time 0 until the time point ts the preheating of the sintering chamber and the air release and replacement by process vapour between the sintering material in the chamber is performed. Thereafter the so-called autoclave heating and steam application takes place. The pressure rises rapidly up to a sintering pressure SP1 from which on the curve flattens considerably off. This change characterizes the softening time point tw1. For the holding time TH1 the sintering of the plastic material by continuous heating and steaming is performed. Afterwards the sintering chamber walls are cooled and the pressure drops to the maximum dismission pressure EP1 related to the reaching of which the dismission time TE1 is defined.

The corresponding temperature course Tv1 is shown during the beginning of the autoclave steaming a certain rising speed depending upon the heat needed. As soon as the softening begins the temperature rising speed drops and usually, if the temperature measurement is done near to the chamber wall, a little short temperature decrease of about 1° C. is measured following which the temperature rises quicker than before flattening off later on tending asymptotically to a limit value. During the following cooling phase it is checked if a given maximum dismission temperature ET1 is reached. Because this is reached in the example shown prior to reaching the maximum dismission pressure EP1 the cooling is continued otherwise a swelling of the sintered part might happen after dismission.

The signal courses the reference symbols of which are ending with a FIG. 1 belong to a material with a raw material density of 27 g/l and those symbols ending on FIGS. 2 and 3 belong to material of a density of 23 g/l. The ligher material has by the advanced preprocessing less pentane content which causes in comparison a lower increase of the sintering pressure, and the sintering pressure SP2 at the softening point tw2 at which the curve is flatening is comparably lower because of the lower pentane content.

As far as the same holding time TH2a is provided as in the first case the full line curves apply. The lighter material will be dismissed after cooling to a lower maximum dismission pressure EP2 at the dismissing time TE2.

The pressure course Pv3 relates to a product which demands a very dense surface wherefore the holding time is elongated for the duration of the time slice TH2b. The higher temperature at the end of this time leads to a longer cooling time until the maximum dismission pressure EP2 is reached compared to the pressure course Pv2 with shorter holding time TH2a. If the allowed tolerance of swelling is reduced the maximum dismission pressure is to be reduced. The maximum dismission temperature is reached at the temperature course Tv2 earlier to the maximum dismission pressure EP2. The maximum dismission temperatures ET1, ET2 are determined to be by the difference temperature TU lower than the sintering temperatures ST1, ST2 at the softening time. This temperature difference TV is chosen somewhat larger if higher precision parts are demanded, which ensures that the frozen state of the material is kept even if the surface of the object is heated again be the heat flow from the inner part of it. The temperature difference TU has to be at least as large as the softening temperature range of the material is, which amounts in this case to 20° C.

In FIG. 2 two courses of sintering pressures Pva, Pvb are shown which belong to a dry and a humid material. The heating phase Ph and the cooling phase Pk shown are ending at the dismission time point TEa. The autoclave steaming starts at time ts. The pressure is measured from then on periodically with equal time distances Dt, which are short compared to the pressure build up time and may be e.g. 100 ms. The related consecutive pressure differences which are equal to the pressure rising speed DPS1, DPS2, ... DPSn are calculated and compared to the pressure rising speed DPS1 at the beginning and they are checked if a given measure of the relative rising speed is reached. This measure is e.g. set to 25%. If this is reached the given point in time is defined to be the softening time point and the sintering pressure PSa is taken. Then the holding time is started and at its end the heating and steaming phase is terminated. The following cooling phase is terminated when the pressure at dismission time TEa passes the maximum dismission pressure EPa.

The humid material belongs to the courses the reference symbols of which are ending with the character b. The duration of the corresponding times are elongated because of the higher energy consumption for evaporation and condensation of the humidity. The pressure rising speed DPS1b is smaller as well at the beginning at the time when reaching the sintering pressure PSb at the softening point. Thus the control method compensates for the humidity content automatically.

In FIG. 3 there are the pressure and temperature courses Pv4, Pv5, Tv4, Tv5 of a 5 mm and a 70 mm thick product shown by dotted respectively full lines. The thin product reaches the softening time point tw4 quicker, and its corresponding sintering pressure SP4 is lower than the sintering pressure SP5 of the thicker part at its softening time point tw5. Both parts are sintered with the holding time TH and cooled afterwards, what is done in a shorter time with the thinner part. Because the material is equal both parts show the same softening temperature ST4, ST5 which leads to the same maximum dismission temperature ET4, ET5. The maximum dismission pressures EP4, EP5 are according to the differing sintering pressures SP4, SP5 at the softening time point chosen different to avoid a swelling of the thicker part. As can be seen, the thinner part will be dismissed reaching the higher dismission pressure EP4 and the thicker one reaching the dismission temperature ET5 or another lower dismission temperature ET5' as described further down. The related dismission times TE4, TE5, TE5' are shown.

The control method automatically handles different geometry of parts produced. Depending on it the length of the process phases are changing as shown. Apart of this control of the sintering cooling and dismission a feed back control to the precedent process steps is provided equalizing the material data of the material for sintering.

Figure 6:
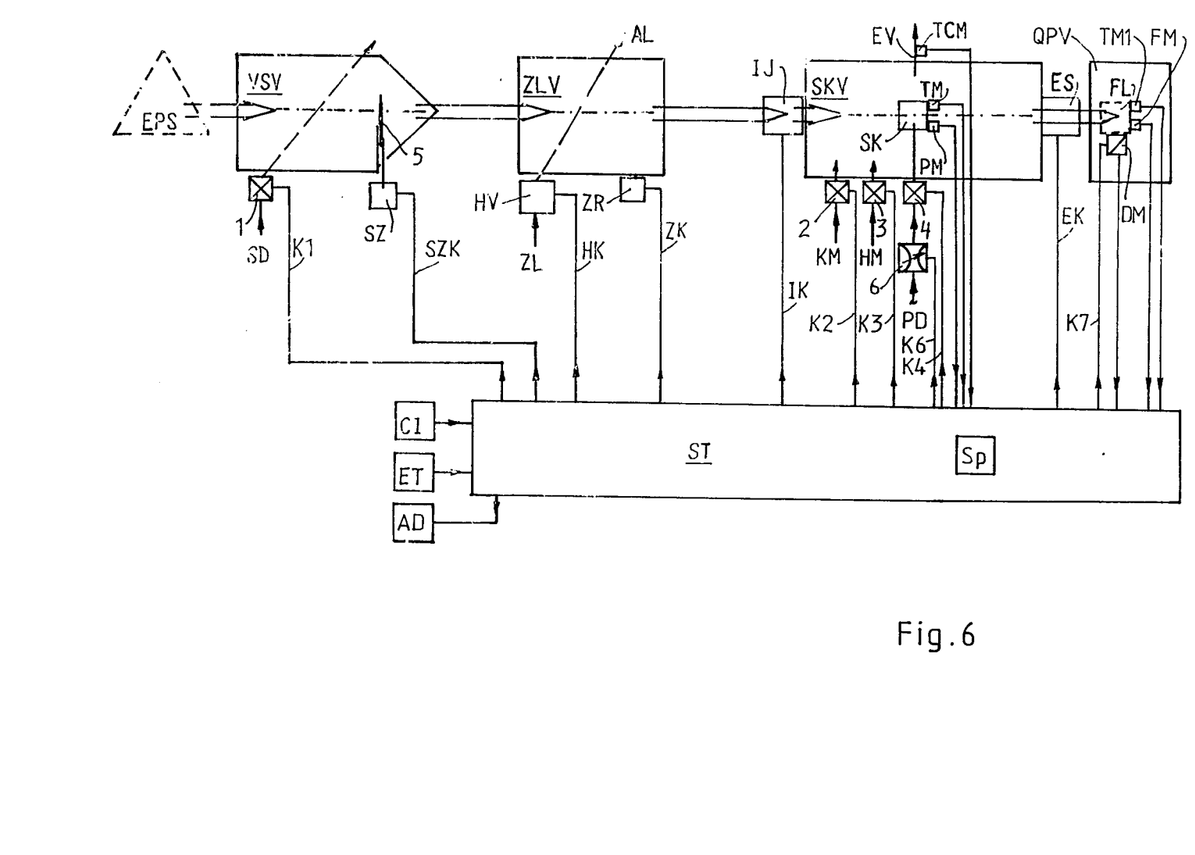
FIG. 6 is showing a schematic drawing of an apparatus and control equipment for the application of the method.

An overview of such process equipment and control circuitry is given in FIG. 6. The expandable polystyrol material EPS is passing three process steps. In the prefoaming equipment VSV foaming steam SD will be applied to it which is supplied under control of valve 1. The prefoaming time is controlled by the time control unit SZ by means of a controllable gate 5. Passing this, the prefoamed beads are fed to the drying and interim storage equipment ZLV. There fresh air ZL heated by the heater HV is applied to them and the humidity loaden off-air AL is released from there. The storage time in the interim storage is controlled by the time control unit ZR which may be by means of a speed controlled transport equipment. A further not shown longer lasting storage may be provided at low temperature.

The preconditioned material will be injected by the injector IJ into the sintering chamber SKV always filling it completely. After the sintering and cooling the sintered part FL is dismissed in conventional manner by the opening, closing and dismissing mechanism ES and fed to the quality measuring station QPV. Under control of the valves 2 and 3 at heating and a cooling media HM, KM (respectively) are applied to the sintering equipment. Condensed vapour will be released by the outlet EV. During the heating phase Ph process steam PD is applied via valve 4 to the sintering chamber SK. At their inner wall temperature and pressure sensors TM, PM are installed the signal lines of which are connected to the control unit ST. In the heating or steam chest surrounding the sintering chamber as well temperature and pressure sensors may be installed. Especially at the outlet a temperature sensor TCM is provided the signal of which is showing a different course than the sintering chamber temperature but it is showing a characterizing change at the softening time point as well because during the start up of the autoclav heating the temperature of the condensate is nearly constant and after the softening time point it rises rapidly. In the simplest version of the equipment only this single one temperature sensor TCM is necessary.

Further a clock Cl, an input equipment ET, e.g. a key board, for the feeding in of the quality demands, the holding time, the temperature difference TU etc., is connected to the control unit ST. This control unit acts on the measured signals by means of a program according to the method and generates control signals in appropriate manner feeding them to the controlling means.

The control unit ST controls via the signal lines K1 to K4 the valves 1 to 4 whereby the valve 1 defines the prefoaming, the opening of valve 2 defines the cooling phase Pk and the opening of the valves 3 and 4 are handling the heating phase Ph and the sintering. Further the signal SZK defines the prefoaming time, the signal HK controls the heater HV, the signal ZK controls the interim storage time, the signal IK controls the injection and the signal EK is activating the closing respectively opening of the sintering chamber. During the working on the measured values for deriving the control signals tolerance checks are provided and transitions are monitored at a printing or display device AD.

Figure 4:
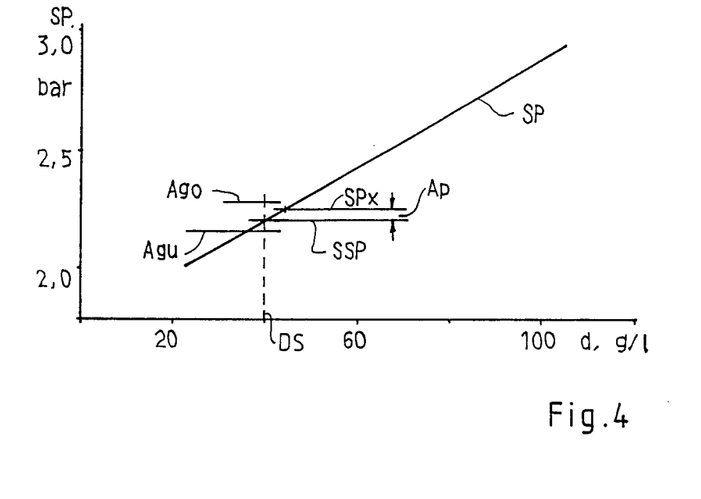
FIG. 4 is showing the correlation of the sintering pressure of materials of different raw densities.
Figure 5:
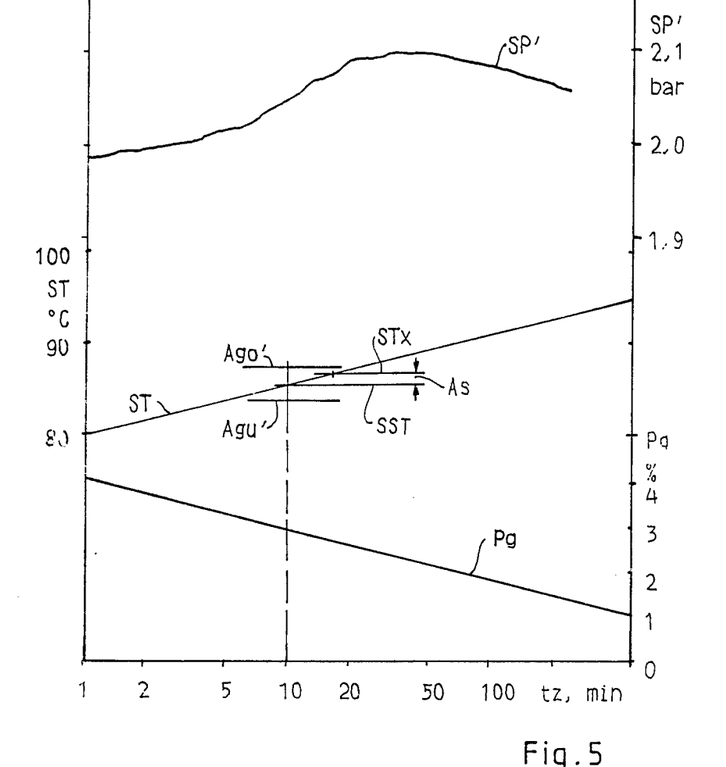
FIG. 5 is showing the effect of the interim storage time on the softening temperature, the related sintering pressure and the pentan content.

The way of control of the prefoaming and interim storage process steps can be understood at hand of the dependencies shown in FIGS. 4 and 5 which are based upon practical experience. FIG. 4 is showing the sintering pressure SP at the softening time point for various materials being prefoamed to varios raw material densities d. If the demanded density DS is 40 g/l, then at the softening a certain known sintering pressure SSP is demanded. If the real sintering pressure SPx at the softening time has a positive deviation Ap to the demanded value, the density is too high and the prefoaming steam is to be increased by a wider opening of the valve 1 or the prefoaming time is to be elongated by shifting the gate 5. As far as a closed loop regulator is provided for the prefoamed material density the reference value of the density may be corrected by the control signal. For reason of stability of the process the regulating range is limited between an upper and a lower limit Ago, Agu for the deviation Ap.

FIG. 5 is showing the resulting effects of the diffusion processes which take place at a temperature of 60° C. in the interim storage equipment ZLV. The relative pentane content Pg is changing during 8 hours from an initial value of 4% to a final value of 1%. The respective materials are showing softening temperatures ST ranging from 80° C. to 93° C. Further a related sintering pressure SP' results which has its maximum for materials of interim storage time lasting for about 1 hour. If the temperature is measured at the inner sintering chamber wall it may be a few degrees lower than shown.

The softening temperatures STx measured in a certain cycle will be compared to a certain given sintering temerature value SST and the deviation As to it is used in the feed back control of the time control unit ZR or the heater HV. The range of the deviation As is limited to given limits Ago', Agu'. Reaching of the limits Ago, Ago'; Agu, Agu' are monitored and reported to an operator of the equipment.

In a similar manner the pressure rising speed DPS1, DPS1b—FIG. 2—or the temperature rising speed is used for the feed back control of the heater. Further it is possible to separate the drying and interim storage equipment. The method shown is applicable as well if other heating and cooling methods using microwaves, compressed air or vacuum are provided.

The quality measuring equipment PQV in FIG. 6 is showing a humidity sensor FM which may be a known electromagnetic absorption sensor. Its signal is evaluated by the control unit ST delivering a control signal K6 to the sintering steam pressure control valve 6.

Further a temperature sensor TM1 measuring the temperature of the released part FL is provided and the pressure tension and impact reaction actuator and sensor DM is installed there. The actuator is controlled via signal line K7 by the control unit ST pressing a stamp agianst the surface of the object whereby its movement invading into the material is sensed. Further with one or several pulse type actuations the surface is tested and the depth of invading is sensed. In correlation to these sensed signals and in dependence from the sensed temperature the pressure tension and the absorption factor are derived.

The absorption factor will be compared to a given value and the deviation is used for the control of the steam pressure valve 6 via line K6 whereby a lower absorption factor will increase the steam pressure.

Further a too low absorption factor measuring value may result form a too high dismission temperature because especially thick parts may have a plastified inner portion during the measurement. This has to be considered in certain cases. These will be detected by several measurements of the surface temperature with the sensor TM1 in given time distances. Thick parts will show a temperature rise. This measured temperature rise will be used for the determination of a lowering of the maximum dismission temperature ET5—see FIG. 3—to a value ET5'. Thus thicker parts compared to thinner ones will be dismissed at a later dimission time TE5'.

Figure 7:
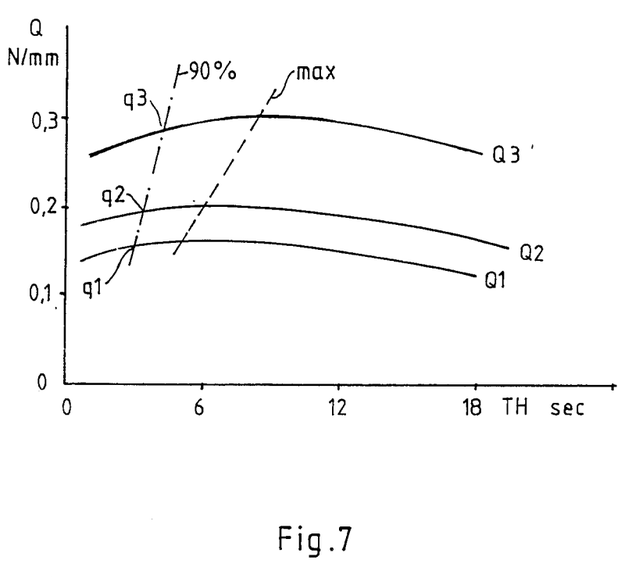
FIG. 7 is showing the correlation between the various pressure tension measured and various holding times for materials of different raw densities.

FIG. 7 is showing the relation of various measured pressure tensions Q3, Q2, Q1 belonging to material of the raw material densities of 37, 28 and 23 g/l sintered with various holding times TH. The dashed line referenced max is connecting the maxima of the curves, and it is showing that denser materials need longer holding times for the achievement of the maximum pressure tension. The dash-point line referenced 90% is connecting such points where a reduced holding time 90% of the achievable pressure tension is reached. This is at about 50% of the holding time necessary for a maximinimum pressure tension. For economic reasons the corresponding values q1, q2, q3 are the corresponding demanded pressure tension values and the deviation measured at a certain part is used for the correction of the determination of the holding time in the following sintering cycle. This correction preferably is done in increments.

Similar to the examples shown other quality parameters may be evaluated and used for feed back control. The stability of the control will be reached be limiting the range as described related to FIGS. 4 and 5. The optimum control values reached are stored in the memory Sp of the control unit ST—FIG. 6, and they are used for further process start ups under equivalent conditions if other materials or parts are to be handled.

The control of the sintering process step via feed back from the quality measurement equipment enables to compensate quite large deviations from the given preprocessing standards which may occur by preprocess defects. Such compensation in most cases may be achieved at cost of process time and energy but save the material.

The feed back control of the process steam pressure causes depending changes in temperature and pressure rising speed. This effect is to be corrected when the rising speed is used for the control of the drying process step.

We claim:

1. A method for the control of a plastic prefoaming and sintering process comprising foaming plastic material in a first process step in a prefoaming device by a controlled heat application to reduce the density and enlarge the bead size of the plastic, conducting drying in a second process step at a predetermined temperature during a predetermined time, injecting the resultant foamed plastic cycle by cycle into a sintering chamber, heating the plastic by applying process steam until reaching a given sintering status in the sintering chamber, the sintering status being detected by a pressure or temperature measurement, terminating the heating, conducting cooling, during said cooling applying a cooling media and terminating said cooling when a given cooling condition is reached and dismissing the sintered product when a given maximum dismission pressure and a given maximum dismission temperature are reached or passed, wherein for the detection of the sintering status a softening time point is detected from the timely course of the pressure or temperature measured and in relation to which softening time point the termination of the heating is determined after a given holding time has passed, and measuring and storing a sintering temperature or a sintering pressure value at the softening time point and determining the maximum dismission temperature or the maximum dismission pressure from the stored temperature or pressure value, wherein the detection of the softening time point being done by cyclic measurement of the temperature or pressure in such time differences which are short compared to a pressure rising time during the heating, determining a measured value of pressure or temperature rising speed at each measurement time, comparing said measured value rising speed to the rising speed measurement time, comparing said measured value rising speed to the rising speed measured at the beginning of the heating and checking when said measured value rising speed has changed to a given percentage of said rising speed measured at the beginning of the sintering phase.

2. A method according to claim 1, wherein the determination of the length of the holding time being conducted corresponding to a given pressure strength or shock absorption factor quality standard and measuring the pressure strength or absorption factor value of the dismissed sintered product and comparing the measured value of pressure strength or shock absorption factor with the given quality standard of pressure strength or shock absorption factor and using the difference between them for the determination of the holding time whereby the lower the measured pressure strength or absorption factor, the longer then the holding time will be determined for a following cycle.

3. A method according to claim 1, wherein the determination of the maximum dismission temperature and pressure being conducted such that they are lower the lower the sintering temperature or pressure at the softening time point are and that the temperature difference between the sintering temperature and the maximum dismission temperature is larger the closer a given size and deformation quality standard is.

4. A method according to claim 1, further comprising a comparison of the sintering pressure value at the softening time point with a standard value and using the difference of these values for a following cycle control of the first process step in such a way that the higher the measured sintering pressure, the more intensified is the prefoaming and the lower the measured sintering pressure is, the less intensified is the prefoaming.

5. A method according to claim 1, further comprising a comparison of the sintering temperature value at the softening time point with a standard value and using the difference of these values for a following cycle control of the second process step whereby the lower the sintering temperature, the more intensified is the drying and the higher the sintering temperature is, the less intensified is the drying.

6. A method according to claim 5, further comprising a measuring of the pressure or temperature rising speed at the beginning of the heating and comparing the measured value with a standard value and using the difference of these values for a following cycle control of the second process step whereby the lower the measured rising speed, the greater the drying is intensified and the higher the measured rising, the less intensified is the drying.

7. A method according to claim 2, further comprising a measuring of a surface temperature value of the dismissed sintered product in given time intervals and determining the temperature rise and correcting the measured pressure strength or absorption factor value according to a given function of the temperature value measured or of the temperature rise determined.

8. A method according to claim 7, further comprising the determining of the maximum dismission temperature and reducing it in proportion to the determined temperature rise at the surface of the dismissed product.

9. A method according to claim 7, further comprising a control of a sintering steam pressure using the difference between the pressure strength or absorption factor value measured and the given standard value whereby the steam pressure is increased if the value measured is lower than the standard value and the steam pressure is decreased if the value measured is higher than the standard value.

10. A method according to claim 9, wherein the pressure strength or absorption factor standard is such that it corresponds to about 90% of the maximum achievable value at a given raw material density.

11. A method according to claim 1 further comprising a comparison of measured values for the sintering temperature or pressure at the softening time point or of the measured quality values of the sintered product with related standard values and employing the differences of these values to increment or decrement related given control values for a following cycle.

12. A method according the claim 11, further comprising a comparison of the differences of the measured and standard values with related given upper and lower limit values and indicating an attainment of such a limit at an output device.

* * * * *